United States Patent
Hong et al.

(10) Patent No.: US 10,901,388 B2
(45) Date of Patent: Jan. 26, 2021

(54) METHOD AND SYSTEM FOR CREATING ENERGY DEMAND MODEL

(71) Applicant: UNIVERSITY—INDUSTRY COOPERATION GROUP OF KYUNG HEE UNIVERSITY, Gyeonggi-do (KR)

(72) Inventors: Choong Seon Hong, Gyeonggi-do (KR); Shirajum Munir Md., Gyeonggi-do (KR); Sarder Fakhrul Abedin, Gyeonggi-do (KR); Do Hyun Kim, Gyeonggi-do (KR)

(73) Assignee: UNIVERSITY-INDUSTRY COOPERATION GROUP OF KYUNG HEE UNIVERSITY

( * ) Notice: Subject to any disclaimer, the term of this patent is extended or adjusted under 35 U.S.C. 154(b) by 108 days.

(21) Appl. No.: 16/175,566

(22) Filed: Oct. 30, 2018

(65) Prior Publication Data
US 2020/0041972 A1    Feb. 6, 2020

(30) Foreign Application Priority Data
Jul. 31, 2018  (KR) .................. 10-2018-0089118

(51) Int. Cl.
G05B 19/042 (2006.01)
(52) U.S. Cl.
CPC .. G05B 19/0428 (2013.01); *G05B 2219/2639* (2013.01)
(58) Field of Classification Search
CPC ........ G05B 19/0428; G05B 2219/2639; G05B 19/042
See application file for complete search history.

(56) References Cited

U.S. PATENT DOCUMENTS

| | | | |
|---|---|---|---|
| 2018/0039897 A1* | 2/2018 | Joshi | G06N 5/04 |
| 2019/0041960 A1* | 2/2019 | Guim Bernat | G06F 9/4893 |
| 2019/0171987 A1* | 6/2019 | Kopp | H02J 3/32 |

FOREIGN PATENT DOCUMENTS

| | | |
|---|---|---|
| KR | 10-2009-0032486 | 4/2009 |
| WO | 2009/075246 | 4/2011 |

OTHER PUBLICATIONS

Sitton-Candanedo, et al., "Edge Computing, IoT and Social Computing in Smart Energy Scenarios", 2019, sensors. (Year: 2019).*

(Continued)

*Primary Examiner* — Mohammad Ali
*Assistant Examiner* — Sheela Rao
(74) *Attorney, Agent, or Firm* — Adsero IP

(57) ABSTRACT

The present disclosure relates to a method for generating an energy demand model by a multi-access edge server, the method including: a step a of receiving a task execution request signal including a bit value from a user; a step b of matching a task to one or more pre-classified groups using the bit value; a step c of extracting a feature of energy consumed to perform the task according to a criterion set differently for each group; a step of performing the steps a to c for one or more task execution request signals received from one or more users during a time period and generating an energy demand pattern for the time period using a feature of energy for one or more tasks performed during the time period; and a step of generating an energy demand model by time using one or more energy demand patterns by time and energy cost by time.

18 Claims, 4 Drawing Sheets

(56) References Cited

OTHER PUBLICATIONS

Boyd, "What is Edge Computing? A Definition", Aug. 2, 2017, sdxcentral (Year: 2017).*
Munir, et al., "Temporal Energy Demand Extrapolation for Mobile Edge based on Computational Task in Smart-Grid Framework", Abstract, Department of Computer Science and Engineering, Kyung Hee University, South Korea, Thesis Publication Jun. 22, 2018.

* cited by examiner

Figure 4

*Algorithm:* *Temporal Demand Extrapolation*

1. Input : Task List $J_t$ , Edge $F_t$
2. Output: Extrapolation vector $h_t$
3. Repeat{
4.    Repeat{
5.    Step 1: Feature Extraction:
6.      Find$\sum_{v \in F} P_t^v + \sum_{v \in F} L_t^d P_t^d + \sum_{v \in F} P_t^m$
7.      Calculate $L_t$ using eq. (1)
8.    Step 2: Preprocessing:
9.      Scale $X_t$
10.    Step 3: Modelling():
11.      Find: $h_t$
12.    } Until $\forall J \in F$
13. } Until $\forall F \in B$

METHOD AND SYSTEM FOR CREATING ENERGY DEMAND MODEL

CROSS-REFERENCE TO RELATED APPLICATION

This application claims priority to and the benefit of Korean Patent Application No. 10-2018-0089118, filed Jul. 31, 2018; the disclosure of which is incorporated herein by reference in its entirety.

BACKGROUND OF THE INVENTION

1. Field of the Invention

The present disclosure relates to a method and a system for creating an energy demand model and, more particularly, to a method and a system for creating an energy demand model that estimates energy demand per time using classified energy loads.

2. Description of the Prior Art

Multi-access Edge Computing (MEC) is a multi-access network technology, which allows users to receive various services and content by assigning computing capability to a wireless base station. MEC is required to process a task upon request from a user while continuously supplying energy to a multi-user network environment. Therefore, in order to properly manage energy for a multi-access network, it is essential to estimate energy demand based on the loads of various tasks. To satisfy such needs, studies are being conducted in various fields, such as delay-sensitive service management, a Green IoT-based structure, and IoT technology for a cellular network.

However, these studies generally do not consider energy management for network resources. A few studies considering energy management focus only on energy management for industries and home appliances that use a smart grid and consider an access point, a mobile edge, and a base station, thus not considering a multi-access network environment. Therefore, it is necessary to consider multi-access network resources in terms of energy demand management through a smart grid framework.

SUMMARY OF THE INVENTION

The present disclosure has been made to solve the above-mentioned problems and an aspect of the present disclosure is to classify and categorize various computing tasks in a network infrastructure including an access point, a base station, a multi-access edge server, a fog server, and a cloud server and is to generate an energy demand model by time on the basis thereof.

An aspect of the present disclosure is to predict energy demand on the basis of an energy demand model by time.

An aspect of the present disclosure is to generate an energy demand model in view of the diversity of tasks by generating an energy demand model using a task matched to one or more groups.

An aspect of the present disclosure is to improve economic efficiency by controlling the ratio between commonly used energy and alternative energy in view of a group and electricity cost.

An aspect of the present disclosure is to efficiently perform energy management by distributing energy loads for each access edge server according to an energy demand model by time.

In accordance with an aspect of the present disclosure, there is provided a method for generating, by a multi-access edge controller, an energy demand model, the method including: a step a of receiving a task execution request signal including a bit value from a user; a step b of matching a task to one or more pre-classified groups using the bit value; a step c of extracting a feature of energy consumed to perform the task according to a criterion set differently for each group; a step of performing the steps a to c for one or more task execution request signals received from one or more users during a time period and generating an energy demand pattern for the time period using a feature of energy for one or more tasks performed during the time period; and a step of generating an energy demand model by time using one or more energy demand patterns by time and energy cost by time.

The groups include a first group including a task that cannot be suspended and postponed, a second group including a task that cannot be suspended but does not necessarily require real-time processing, and a third group including a task that can be suspended and does not require an always-on power supply.

Total energy consumption for one or more tasks matched to the first group during the time period is calculated using the number of access edge servers and energy consumption for each task matched to the first group during the time period.

Total energy consumption for one or more tasks matched to the second group during the time period is calculated using the number of tasks requested to be performed, an energy coefficient corresponding to the capacity of an access edge server, total required calculation amount for one access edge server during the time period, and the calculation capacity of the access edge server.

Total energy consumption for one or more tasks matched to the third group during the time period is calculated using the number of access edge servers, energy consumption for each task matched to the third group during the time period, and a variable having a binary value.

The feature of the energy includes a task execution start time, a time required to perform a task, a consumption of commonly used energy, and a consumption of alternative energy.

The step of generating the energy demand model includes a step of normalizing a consumption of commonly used energy and a consumption of alternative energy for the one or more tasks performed during the time period.

The step of normalizing includes: a step of setting a minimum value among all energy consumptions for the one or more tasks performed during the time period to 0 and a maximum value to 1; and a step of matching all the energy consumptions to a value between 0 and 1 on the basis of the minimum value and the maximum value, and the energy consumptions are related to the consumption of the commonly used energy or the consumption of the alternative energy.

The energy demand model is generated using a linear data regression analysis model.

Further, in accordance with an aspect of the present disclosure, there is provided a system for generating an energy demand model, the system including: a receiver configured to receive a task execution request signal including a bit value from a user; a extractor configured to match a task to one or more pre-classified groups using the bit value and to extract a feature of energy consumed to perform the task according to a criterion set differently for each group; and a generator configured to generate an energy demand pattern for a time period using a feature of energy for one or more tasks performed during the time period and to generate an energy demand model by time using one or more energy demand patterns by time and energy cost by time.

The extractor includes a group matching unit configured to match the task to a first group including a task that cannot be suspended and postponed, a second group including a task that cannot be suspended but does not necessarily require real-time processing, or a third group including a task that can be suspended and does not require an always-on power supply.

Total energy consumption for a task matched to the first group during the time period is calculated using the number of access edge servers and energy consumption for each task matched to the first group during the time period.

Total energy consumption for one or more tasks matched to the second group during the time period is calculated using the number of tasks requested to be performed, an energy coefficient corresponding to the capacity of an access edge server, total required calculation amount for one access edge server during the time period, and the calculation capacity of the access edge server.

Total energy consumption for one or more tasks matched to the third group during the time period is calculated using the number of access edge servers, energy consumption for each task matched to the third group during the time period, and a variable having a binary value.

The feature of the energy includes a task execution start time, a time required to perform a task, a consumption of commonly used energy, and a consumption of alternative energy.

The generator includes a data processor configured to normalize a consumption of commonly used energy and a consumption of alternative energy for the one or more tasks performed during the time period.

The data processor sets a minimum value among all energy consumptions for the one or more tasks performed during the time period to 0 and a maximum value to 1 and matches all the energy consumptions to a value between 0 and 1 on the basis of the minimum value and the maximum value, and the energy consumptions indicate the consumption of the commonly used energy or the consumption of the alternative energy.

The generator generates the energy demand model using a linear data regression analysis model.

As described above, according to the present disclosure, it is possible to classify and categorize various computing tasks in a network infrastructure including an access point, a base station, a multi-access edge server, a fog server, and a cloud server and to generate an energy demand model by time on the basis thereof.

According to the present disclosure, it is possible to predict energy demand on the basis of an energy demand model by time.

According to the present disclosure, it is possible to generate an energy demand model using a task matched to one or more groups, thereby generating an energy demand model in view of the diversity of tasks.

According to the present disclosure, it is possible to control the ratio between commonly used energy and alternative energy in view of a group and electricity cost, thereby improving economic efficiency.

According to the present disclosure, it is possible to distribute energy loads for each access edge server according to an energy demand model by time, thereby efficiently performing energy management.

BRIEF DESCRIPTION OF THE DRAWINGS

The above and other aspects, features and advantages of the present disclosure will be more apparent from the following detailed description taken in conjunction with the accompanying drawings, in which:

FIG. 4 illustrates an algorithm for generating an energy demand management model according to an exemplary embodiment of the present disclosure.

DETAILED DESCRIPTION OF THE EXEMPLARY EMBODIMENTS

Figure 1:
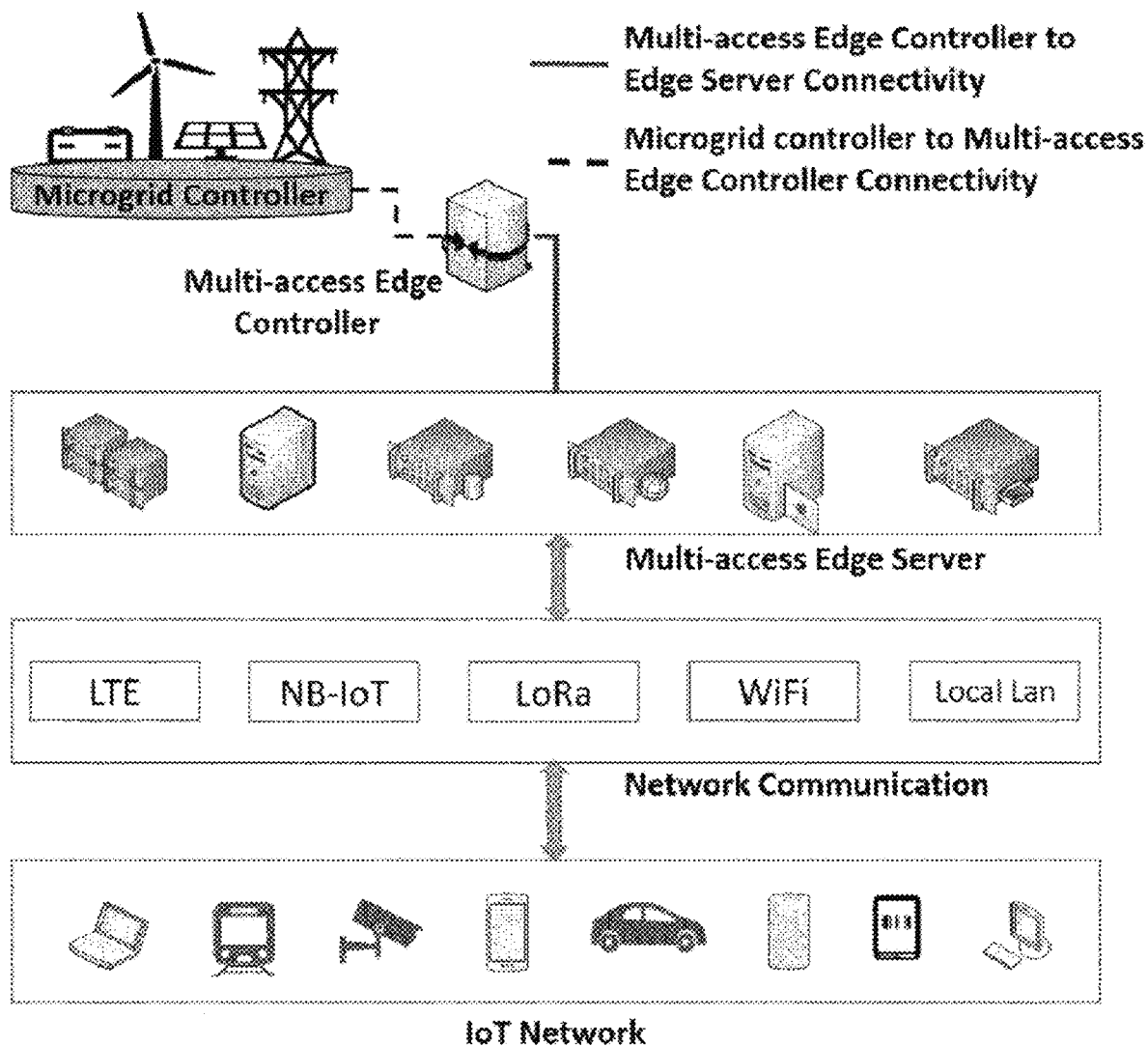
FIG. 1 illustrates an environment in which an energy demand management system operates according to an exemplary embodiment of the present disclosure.

The above aspects, features, and advantages will be described in detail with reference to the accompanying drawings, and thus the technical concept of the present disclosure can be readily implemented by those skilled in the art. In the following description, a detailed description of known functions and configurations incorporated herein will be omitted when it may obscure the subject matter of the present disclosure.

The same reference numerals are used to designate the same or similar components in the drawings, and all combinations described in the specification and claims may be achieved in any manner. Unless specified otherwise, it should be understood that singular referents may include one or more referents and reference to singular expressions may also include plural expressions.

The terms used herein are merely for the purpose of describing particular illustrative embodiments and are not intended to limit the scope of other embodiments. As used herein, singular forms may be intended to include plural forms as well unless the context clearly indicates otherwise. The term "and/or" includes any and all combinations of one or more of the associated listed items. The terms "include", "including", "comprise", "comprising", "have", or "having" have a comprehensive meaning, and accordingly these terms specify the presence of stated features, integers, steps, operations, elements, and/or components but do not exclude the presence or addition of one or more other features, integers, steps, operations, elements, components, and/or groups thereof. Steps, processes, and operations of the methods described herein should not be construed as being performed necessarily in such a particular order as discussed or illustrated unless specified otherwise. It should also be understood that additional or alternative steps may be used.

Each of the components may be configured as a hardware processor, the components may be integrated into one hardware processor, or the components may be combined into a plurality of hardware processors.

Hereinafter, exemplary embodiments of the present disclosure will be described in detail with reference to the accompanying drawings.

FIG. 1 illustrates an environment in which an energy demand management system operates according to an exemplary embodiment of the present disclosure. Referring to FIG. 1, the present disclosure may be implemented in an IoT network environment where a microgrid controller is connected to a multi-access edge controller and at least one multi-access edge server is connected to the multi-access edge controller. Specifically, in the IoT network environment, when a user requests a task, a task execution request signal may be generated through LTE, NB-IoT, LoRa, WiFi, or local LAN network communications for the access edge server. The task execution request signal is not limited to a single user but may be associated with one or more tasks requested by one or more users.

That is, the access edge server of the present disclosure may receive a task execution request signal from a user via a communication network, such as LTE, NB-IoT, LoRa, WiFi, and local LAN communication. The access edge server of the present disclosure may also receive a task execution request signal from a cellular network.

Figure 2:
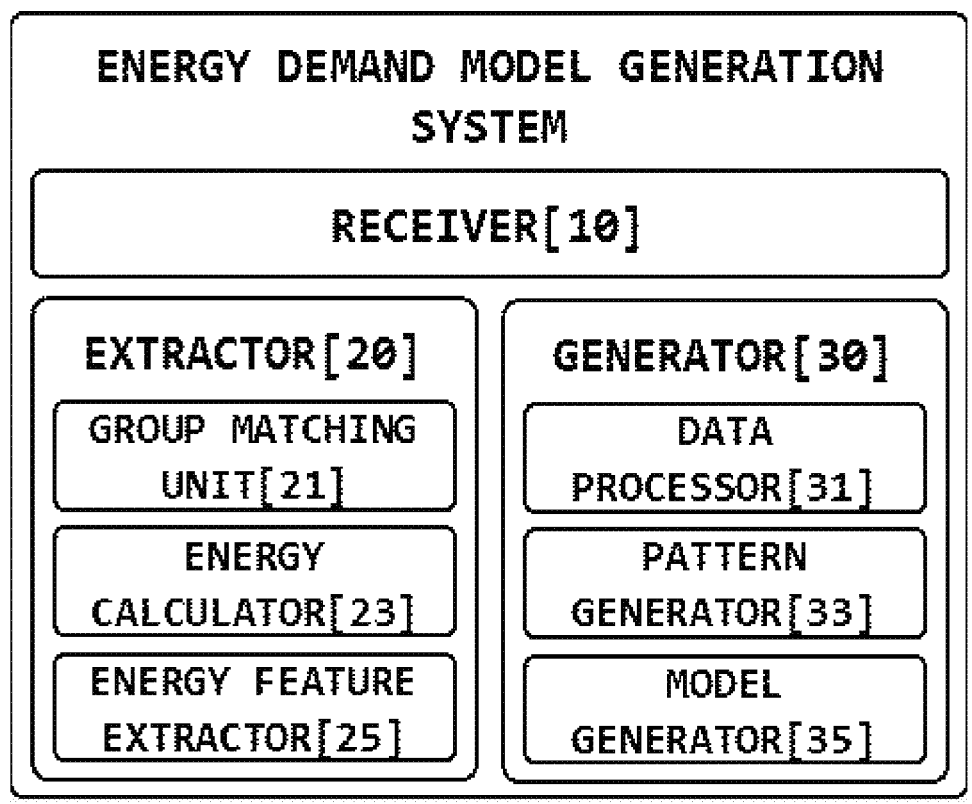
FIG. 2 illustrates the configuration of an energy demand management system according to an exemplary embodiment of the present disclosure.

FIG. 2 illustrates the configuration of an energy demand management system according to an exemplary embodiment of the present disclosure. The energy demand management system is to estimate energy demand for network resources by extracting energy demand pattern information on the basis of the load of an access edge server in a multi-access network environment considering multi-access network resources in terms of energy demand management. To this end, the energy demand management system of the present disclosure may include a receiver 10, an extractor 20, and a generator 30.

The receiver 10 may receive a task execution request signal including a bit value from a user. Specifically, the task execution request signal may be an address using an IPv6 protocol but is not limited thereto.

The extractor 20 may match a task to one or more groups using a bit value included in a task execution request signal and may extract a feature of energy consumed for performing the task using criteria set differently for each group to which the task is matched. More specifically, to this end, the extractor 20 may include a group matching unit 21, an energy calculator 23, and an energy feature extractor 25.

First, one or more groups to which a task is matched may include a first group including a task that cannot be suspended and postponed, a second group including a task that cannot be suspended but does not necessarily require real-time processing, and a third group including a task that can be suspended and does not require an always-on power supply. For example, the first group may include a major task that needs to be continuously performed, such as an emergency service, a vehicle service, and a call service; the second group may include a task that does not need to be performed at the same time as receiving a task execution request signal but cannot be suspended and can be postponed during the task, such as email, messaging, and offline buffering; and the third group may include a modular task that can be suspended and does not require continuous power supply, such as processing of complex and large data.

The group matching unit 21 may analyze a task execution request signal received by the receiver 10 from a user in order to match a task to one or more groups. As described above, the task execution request signal is an address using the IPv6 protocol and may include a 12-bit header and a 20-bit payload. A bit value included in the task execution request signal may be included in an 8-bit traffic class in the 12-bit header. The traffic class may include information for distinguishing different service requirements and may differentiate between data packets. According to an exemplary embodiment of the present disclosure, the group matching unit 21 may match a task to one or more groups through a traffic class included in a task execution request signal.

The group matching unit 21 may also provide 3DPP Quality of Service (QoS) requirements along with one or more preset groups in order to match a task to one or more groups. Here, a QCI, which expresses a priority of QoS as an integer value, may include information on a resource type (GBR or NoN-GBR), a priority (1 to 9), a packet delay tolerance (50 to 300 ms), and a packet loss tolerance ($10^{(-2)}$ to $10^{(-6)}$) for each value. Specific information on the QCI is illustrated in Table 1. Referring to Table 1, the group matching unit 21 may match a task to one or more groups using a packet delay tolerance, in which the group matching unit 21 may match the task: to the first group when a packet delay tolerance for a task execution request signal is 50 to 100 ms; to the second group when the packet delay tolerance is 101 to 200 ms; and to the third group when the packet delay tolerance is 201 to 300 ms. That is, tasks having QCI values of 1, 3, 65, 66, 75, 5, 7, 69, and 79 are matched to the first group, tasks having QCI values of 2 and 70 are matched to the second group, and tasks having QCI values of 4, 6, 8, and 9 may be matched to the third group. In this manner, the group matching unit 21 may match a task to one or more groups using information in the 8-bit traffic class included in a header of a task execution request signal.

The energy calculator 23 may extract the consumption of energy consumed to perform a task according to criteria set differently for each group. Here, the energy calculator 23 may extract the energy consumption of each of commonly used energy and alternative energy used to perform the task. The energy calculator 23 may consider a feature of an access edge server for a task sensitive to an idle state and a delay in order to extract energy consumption for a task matched to the first group. However, since energy consumption for tasks matched to the second and third groups varies depending on a task request to the access edge server, the execution state of the access edge server may be considered. Specifically, the energy calculator 23 may measure energy consumption according to criteria set differently for each of one or more groups.

Assuming that the access edge server of the present disclosure may have the same capacity ($\alpha$) in performing a task and can set a preset finite time period (t) to the same length, the total amount of energy ($L^t$) consumed by the access edge server for a time period of t may be calculated by $\Sigma_{\forall \in F}(L_t^p + L_t^d + L_t^m)$. Here, $L_t^p$ denotes energy consumption for a task matched to the first group, $L_t^d$ denotes energy consumption for a task matched to the second group, and $L_t^m$ denotes energy consumption for a task matched to the third group. That is, total energy consumption refers to total energy consumption for all tasks involved during any time period (t).

First, the energy calculator 23 may calculate total energy consumption ($L_t^p$) for tasks matched to the first group during a time period (t) using the number (F) of access edge servers and energy consumption ($L_t^{p_1}$) for one task matched to the first group during t.

$$L_t^p = \Sigma_{\forall \in F} L_t^{p_1} \qquad \text{[Equation 1]}$$

That is, the energy calculator 23 may calculate total energy consumption for tasks matched to the first group during t through Equation 1. Energy consumption for a task matched to the first group is determined according to a constant for each access edge server, and Equation 1 refers to total energy consumption for all access edge servers belonging to one microgrid controller.

The energy calculator 23 may calculate total energy consumption ($L_t^d$) for tasks matched to the second group during a time period (t) using the number (J) of tasks requested to be performed, an energy coefficient (β) corresponding to the capacity of the access edge server, total required calculation amount (γ) for one access edge server in the time period, and the calculation capacity (α) of the access edge server.

$$L_t^d = \sum_{\forall \in J} \beta \frac{\gamma}{\alpha} \qquad \text{[Equation 2]}$$

That is, the energy calculator 23 may calculate total energy consumption for tasks matched to the second group during t through Equation 2.

The energy calculator 23 may calculate total energy consumption ($L_t^m$) for tasks matched to the third group during a time period (t) using the number (F) of access edge servers, energy consumption ($L_t^{m'}$) for one task matched to the third group during t, and a variable ($\omega_t$) having a binary value.

$$L_t^m = \Sigma_{\forall \in F} L_t^{m'} \omega_t \qquad \text{[Equation 3]}$$

That is, the energy calculator 23 may calculate total energy consumption for tasks matched to the third group during t through Equation 3. Here, $\omega_t$ equal to 1 may indicate that the access edge server performs a task matched to the third group during t.

Further, the energy calculator 23 may use Equation 4 in order to minimize a mistake in average error that may occur between actual energy consumption ($L^t$) and a predicted value ($h_t$). In this case, N denotes the number of data points in a time period of t.

$$\delta_t = \sqrt{\frac{\sum_{i=1}^{N}(L_t - h_t)}{N}} \qquad \text{[Equation 4]}$$

The energy feature extractor 25 may extract an energy feature using energy consumption for one or more tasks performed during a time period, which is extracted by the energy calculator 23. The energy feature may include the execution start time of the task performed during the time period, the time required to perform the task, and energy consumption. Here, the energy consumption may include the consumption of commonly used energy and the consumption of alternative energy which are extracted by the energy calculator 23.

The generator 30 may generate an energy demand pattern in a time period using one or more energy features for a task performed during the time period and energy cost in the time period and may generate an energy demand model per time using an energy demand pattern per time generated for the entire time period. Specifically, the generator 30 may include a data processor 31, a pattern generator 33, and a model generator 35.

The data processor 31 may normalize an energy feature extracted by the extractor 20. Specifically, the data processor 31 may set the minimum value among energy consumptions included in an energy feature for each of one or more tasks performed during a time period to 0, may set the maximum value to 1, and may then match all energy consumptions to a value between 0 and 1 on the basis of the minimum value and the maximum value. The data processor 31 may match all energy consumptions to a value between 0 and 1 using Equation 5.

$$X_t = \frac{x_t - \min(x_t)}{\max(x_t) - \min(x_t)} \qquad \text{[Equation 5]}$$

For example, it may be assumed that when ten tasks are performed during a time period, energy consumptions for the ten tasks are 5, 5, 10, 15, 20, 13, 25, 17, 9, and 13, respectively. Here, the data processor 31 may set a minimum value of 5 to 0, may set a maximum value of 25 to 1, and may match the remaining eight energy consumptions to a value between 0 and 1 on the basis of 5 and 25. Results of normalizing the 10 energy consumptions may be 0, 0, 0.25, 0.5, 0.75, 0.4, 1, 0.6, 0.2, and 0.4. The data processor 31 may match these normalization results to the ten energy consumptions, respectively.

The data processor 31 may normalize an energy feature for a task, thereby reducing capacity required to calculate an energy feature.

The pattern generator 33 may generate an energy demand pattern in a time period using an energy feature for a task performed during the time period, which is normalized by the data processor 31. Here, the generated energy demand pattern may be configured in a matrix format. The pattern generator 33 may generate an energy demand pattern in a time period using task execution start time, the time required to perform the task, the consumption of commonly used energy, and the consumption of alternative energy, which are included in an energy feature for a task performed during the time period. For example, when a first time is 1:30:00 pm to 1:30:30 pm, the pattern generator 33 may extract the total amounts of commonly used energy and alternative energy consumed from 1:30:00 pm to 1:30:30 pm respectively using the consumption of commonly used energy and the consumption of alternative energy for one or more tasks that are being performed or have been performed from 1:30:00 pm to 1:30:30 pm.

That is, the pattern generator 33 may extract the amount of energy consumed during a time period and may generate an energy demand pattern for the time period.

The model generator 35 may generate an energy demand model per time using one or more energy demand patterns per time generated by the pattern generator 33 and energy cost per time. Specifically, the model generator 35 may generate an energy demand model per time using linear data regression analysis. The linear data regression analysis may include an Autoregressive Integrated Moving Average (ARIMA) model or a Long Short-Term Memory (LSTM) model. First, the ARIMA model, as a time series data analysis scheme, is a generalization of an Autoregressive Moving Average (ARMA) model, which describes the current time series value using previous observed values and errors on the basis of results obtained from behavior according to past knowledge or experience. The ARIMA model is used to predict or monitor a future indicator every specified time. Unlike the ARMA model, the ARIMA model is superior to the ARMA model in that the ARIMA model can be applied to unstable time series data. Similarly to the ARIMA model, the LSTM model can memorize previous information for a long time and can thus deduce a result using the previous information. Also, the LSTM model can be updated through a resulting value and can thus a circular property. Therefore, the LSTM model can be reinforced as repeatedly performing a task.

That is, the model generator 35 may generate an energy demand model per time by applying a linear data regression analysis model to an energy feature extracted in each preset time period and energy cost per time.

The present disclosure may predict a demand level for commonly used energy and alternative energy according to the demand per time from one or more access edge servers controlled by a multi-access edge controller using an energy demand model per time generated by the multi-access edge controller, may manage the commonly used energy and the alternative energy accordingly, and may distribute energy loads of the access edge servers.

Hereinafter, an energy demand model generation method according to an exemplary embodiment of the present disclosure will be described with reference to FIGS. 3 and 4. Specific embodiments for describing the energy demand model generation method that overlap with those for the foregoing energy demand model generation system may be omitted herein.

Figure 3:
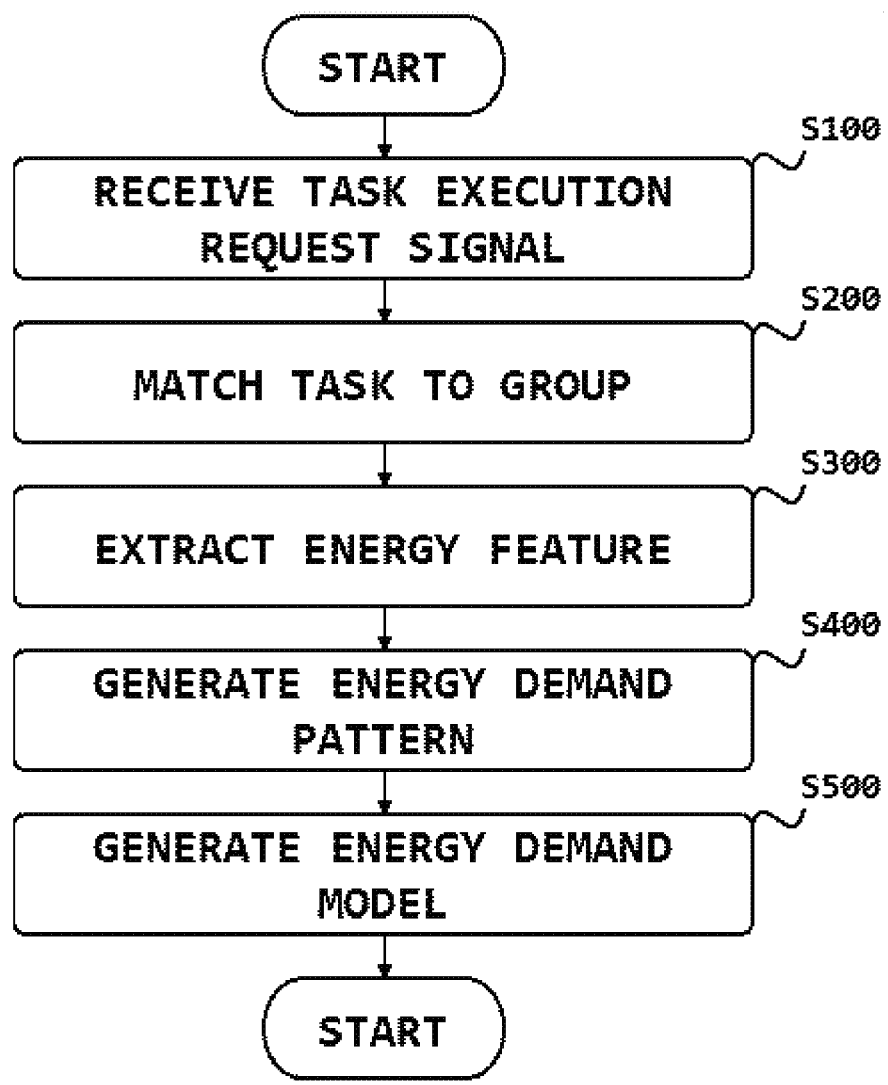
FIG. 3 illustrates an energy demand management method according to an exemplary embodiment of the present disclosure.

FIG. 3 illustrates an energy demand model generation method according to an exemplary embodiment of the present disclosure.

Referring to FIG. 3, a multi-access edge server (hereinafter, "server") may receive at least one task execution request signal from at least one user (S100). That is, the multi-access edge server may receive $m_n$ task execution request signals from n user terminals (n≥0, m≥0). The task execution request signal received from the user may be an address using the IPv6 protocol but is not limited thereto.

When the task execution request signal is received, the server may match a task to one or more preset groups (S200). Specifically, the server may analyze an 8-bit traffic class included in a header of the task execution request signal and may match the task to the one or more groups. Here, the server may match the task to the one or more groups using a packet delay tolerance of one or more pieces of information included in the traffic class. The one or more groups may include a first group including a major task that cannot be suspended and postponed, a second group including a task that cannot be suspended, does not necessarily require real-time processing, and can be postponed, and a third group including a modular task that can be suspended and does not require an always-on power supply.

After matching the task to the one or more groups, the server may extract a feature of energy consumed to perform a task using a criterion set for each group (S300). The feature of the energy may include the execution start time of the task performed during a specified time period, the time required to perform the task, and energy consumption. Here, the energy consumption may include the consumption of commonly used energy and the consumption of alternative energy.

In measuring energy consumption by the server, assuming that the access edge server may have the same capacity (α) in performing a task and can set a preset finite time period (t) to the same length, total energy consumption ($L^t$) for a time period (t) may be calculated by $\Sigma_{\forall \in F}(L_t^p + L_t^d + L_t^m)$. Here, $L_t^p$ denotes energy consumption for a task matched to the first group, $L_t^d$ denotes energy consumption for a task matched to the second group, and $L_t^m$ denotes energy consumption for a task matched to the third group. That is, the total energy consumption refers to total energy consumption for all tasks performed during t.

The server may calculate the energy consumption ($L_t^p$) for the task matched to the first group during t using Equation 1, may calculate the energy consumption ($L_t^d$) for the task matched to the second group during t using Equation 2, and may calculate the energy consumption ($L_t^m$) for the task matched to the third group during t using Equation 3.

Further, the server may use Equation 4 in order to minimize a mistake in average error that may occur between actual energy consumption ($L^t$) and a predicted value ($h_t$).

The server may generate an energy demand pattern for a specified time period using the extracted feature of the energy (S400). Here, the energy demand pattern may be configured by time. The server may first normalize the extracted feature of the energy and may generate an energy demand pattern in a matrix format. First, the server may set the minimum value among energy consumptions for one or more tasks performed during the specified time period to 0, may set the maximum value to 1, and may then match all energy consumptions to a value between 0 and 1 on the basis of the minimum value and the maximum value. Accordingly, the server can reduce capacity for calculating an energy feature.

The server may generate an energy demand model per time using the energy demand pattern in the specified time period (S500). The server may generate the energy demand model per time by applying a linear data regression analysis model including the ARIMA model or the LSTM model to the energy demand pattern in the specified time period and energy cost per time. However, a linear data regression analysis model used to generate the energy demand model per time is not limited to the aforementioned type. By using energy cost per time in generating an energy demand model per time, the server can selectively use either commonly used energy or alternative energy to perform a task in view of suitability and economic efficiency for the task according to energy cost, thereby optimizing energy consumption cost.

The energy demand model per time generated by the above method may be used to predict and manage an energy demand level according to demand by time.

FIG. 4 illustrates an algorithm for generating an energy demand management model according to an exemplary embodiment of the present disclosure, which is associated with the description of FIG. 3.

The exemplary embodiments of the present disclosure disclosed in the present specification and drawings are only illustrative of the present disclosure to facilitate understanding of the present disclosure and are not intended to limit the scope of the present disclosure. It will be apparent to those skilled in the art that other modifications based on the technical idea of the present disclosure are possible in addition to the embodiments disclosed herein.

What is claimed is:

1. A method for generating an energy demand model by a multi-access edge controller, the method comprising:
   a step a of receiving, via an edge server, a task execution request signal, from a user, requesting performance of a task by the edge server, the task execution request signal comprising a bit value;
   a step b of matching the task to one or more pre-classified groups using the bit value;
   a step c of extracting a feature of energy consumed to perform the task according to a criterion set differently for each group;
   a step of performing the steps a to c for one or more task execution request signals received from one or more users during a time period and generating an energy demand pattern for the time period using a feature of energy for one or more tasks performed during the time period;
   a step of generating an energy demand model by time using one or more energy demand patterns by time and energy cost by time; and a step of controlling, via an edge controller, the edge server to perform the task using one of commonly used energy or alternative energy based on the energy demand model.

2. The method of claim 1, wherein the groups comprise a first group comprising a task that cannot be suspended and postponed, a second group comprising a task that cannot be suspended but does not necessarily require real-time processing, and a third group comprising a task that can be suspended and does not require an always-on power supply.

3. The method of claim 2, wherein a total energy consumption for one or more tasks matched to the first group during the time period is calculated using a number of access edge servers and an energy consumption for each task matched to the first group during the time period.

4. The method of claim 2, wherein a total energy consumption for one or more tasks matched to the second group during the time period is calculated using a number of tasks requested to be performed, an energy coefficient corresponding to a capacity of an access edge server, a total required calculation amount for one access edge server during the time period, and a calculation capacity of the access edge server.

5. The method of claim 2, wherein a total energy consumption for one or more tasks matched to the third group during the time period is calculated using a number of access edge servers, an energy consumption for each task matched to the third group during the time period, and a variable having a binary value.

6. The method of claim 1, wherein the feature of the energy comprises a task execution start time, a time required to perform a task, a consumption of commonly used energy, and a consumption of alternative energy.

7. The method of claim 1, wherein the step of generating the energy demand model comprises a step of normalizing a consumption of commonly used energy and a consumption of alternative energy for the one or more tasks performed during the time period.

8. The method of claim 7, wherein the step of normalizing comprises:
    a step of setting a minimum value among all energy consumptions for the one or more tasks performed during the time period to 0 and a maximum value to 1; and
    a step of matching all the energy consumptions to a value between 0 and 1 on the basis of the minimum value and the maximum value, and
    the energy consumptions are related to the consumption of the commonly used energy or the consumption of the alternative energy.

9. The method of claim 1, wherein the energy demand model is generated using a linear data regression analysis model.

10. A system for generating an energy demand model, the system comprising:
    an edge server coupled to one or more user devices;
    an edge controller coupled to the edge server, the edge controller further comprising:
        a receiver configured to receive, via the edge server, a task execution request signal, from a user, requesting performance of a task by the edge server, the task execution request signal comprising a bit value;
        an extractor configured to match the task to one or more pre-classified groups using the bit value and to extract a feature of energy consumed to perform the task according to a criterion set differently for each group; and
        a generator configured to generate an energy demand pattern for a time period using a feature of energy for one or more tasks performed during the time period and to generate an energy demand model by time using one or more energy demand patterns by time and energy cost by time,
    wherein the edge controller is further configured to cause the edge server to perform the task using one of commonly used energy or alternative energy based on the energy demand model.

11. The system of claim 10, wherein the extractor comprises a group matching unit configured to match the task to a first group comprising a task that cannot be suspended and postponed, a second group comprising a task that cannot be suspended but does not necessarily require real-time processing, or a third group comprising a task that can be suspended and does not require an always-on power supply.

12. The system of claim 11, wherein a total energy consumption for a task matched to the first group during the time period is calculated using a number of access edge servers and an energy consumption for each task matched to the first group during the time period.

13. The system of claim 11, wherein a total energy consumption for one or more tasks matched to the second group during the time period is calculated using a number of tasks requested to be performed, an energy coefficient corresponding to a capacity of an access edge server, a total required calculation amount for one access edge server during the time period, and a calculation capacity of the access edge server.

14. The system of claim 11, wherein a total energy consumption for one or more tasks matched to the third group during the time period is calculated using a number of access edge servers, an energy consumption for each task matched to the third group during the time period, and a variable having a binary value.

15. The system of claim 10, wherein the feature of the energy comprises a task execution start time, a time required to perform a task, a consumption of commonly used energy, and a consumption of alternative energy.

16. The system of claim 10, wherein the generator comprises a data processor configured to normalize a consumption of commonly used energy and a consumption of alternative energy for the one or more tasks performed during the time period.

17. The system of claim 16, wherein the data processor sets a minimum value among all energy consumptions for the one or more tasks performed during the time period to 0 and a maximum value to 1 and matches all the energy consumptions to a value between 0 and 1 on the basis of the minimum value and the maximum value, and
    the energy consumptions indicate the consumption of the commonly used energy or the consumption of the alternative energy.

18. The system of claim 16, wherein the generator generates the energy demand model using a linear data regression analysis model.

* * * * *